Figure 1:
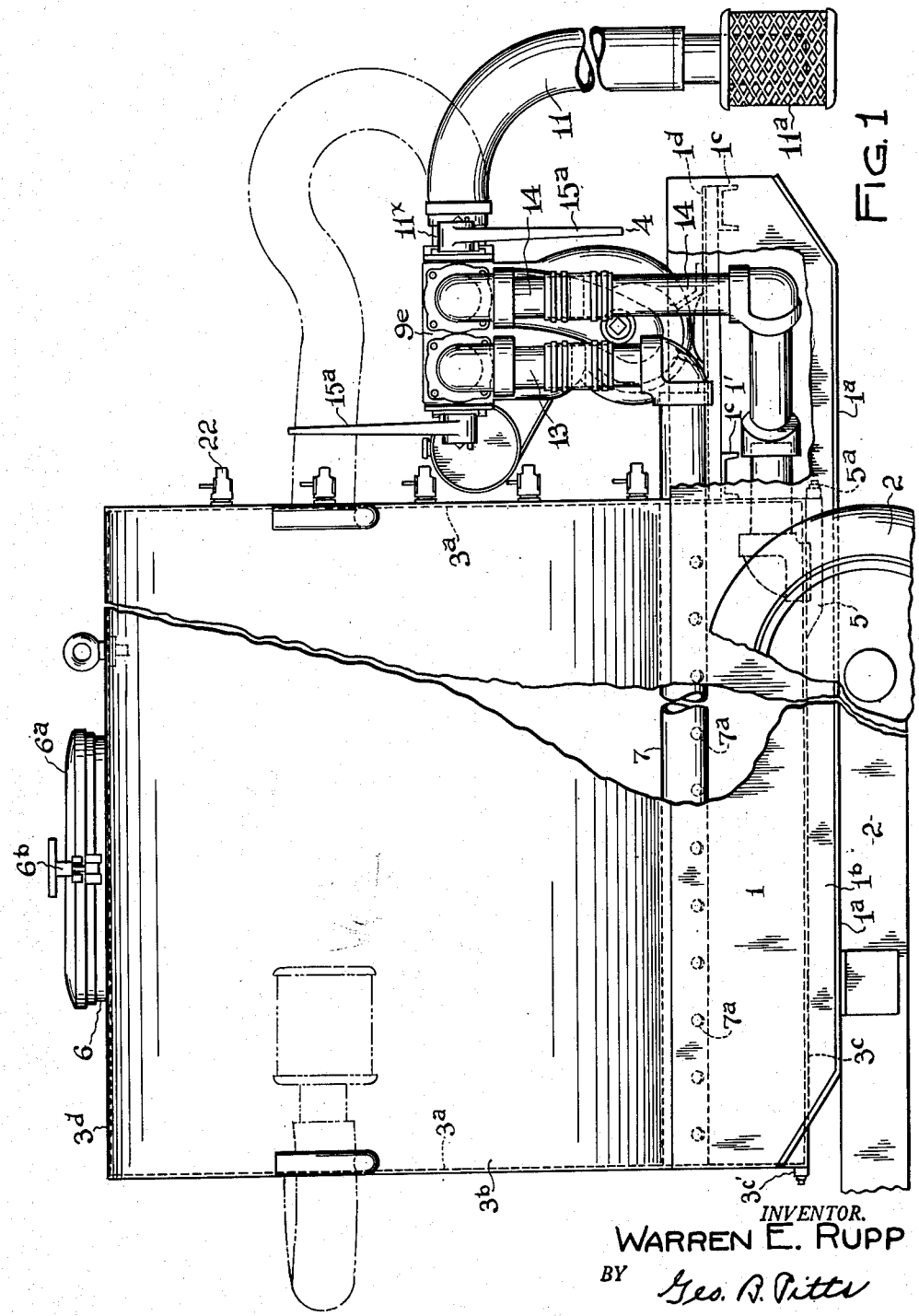

April 7, 1953     W. E. RUPP     2,634,110
PUMP-OPERATED PORTABLE MIXING APPARATUS
Filed Dec. 31, 1948     6 Sheets-Sheet 1

INVENTOR.
WARREN E. RUPP
BY Geo. B. Pitts
ATTORNEY.

INVENTOR.
WARREN E. RUPP
BY
Geo. B. Pitts
ATTORNEY.

INVENTOR.
WARREN E. RUPP
BY
Geo. B. Titus
ATTORNEY.

April 7, 1953 W. E. RUPP 2,634,110
PUMP-OPERATED PORTABLE MIXING APPARATUS
Filed Dec. 31, 1948 6 Sheets-Sheet 6

INVENTOR.
WARREN E. RUPP
BY Geo. B. Pitts
ATTORNEY

Patented Apr. 7, 1953

2,634,110

UNITED STATES PATENT OFFICE 2,634,110

PUMP-OPERATED PORTABLE MIXING APPARATUS

Warren E. Rupp, Mansfield, Ohio, assignor to The Gorman-Rupp Company, Mansfield, Ohio, a corporation of Ohio Application December 31, 1948, Serial No. 68,529

4 Claims. (Cl. 259—95)

This invention relates to apparatus for mixing solids or semi-solids and a liquid to provide a supply of treating material capable of being sprayed. In the application of my invention I have produced treating materials for spraying on various kinds of products, such as trees, shrubbery, fruits, fruit bearing trees, horticultural plants or organisms and farm produce. The solids, when supplied, may be in powder or other form depending upon the kind of solid substance to be used. The character or type of the supplied substance will depend upon the particular kind of products to be sprayed and/or the nature of the trouble to be cured or prevented. In these adaptations of the invention, I have used a mixture of lime, sulphur and water as an insecticide and a solution of copper sulphate and water as a fungicide. The invention is embodied in a portable apparatus having a mixing tank of large size, whereby a large quantity of the desired material may be prepared at a central source of supply and then conveyed to the location where the spraying operation is to take place. The material is pumped from the tank into the container of a suitable spraying equipment for translation over the product to be treated during the spraying of the material. While the spraying operation is being carried out, the apparatus may be driven to the source of supply and recharged with the solid substance mixed with water and returned to the same or a different spraying location. It will be observed that in utilizing the apparatus in this manner, a great deal of time and labor are saved, as the spraying equipment may be maintained substantially in continuous operation for any work period.

The disclosed embodiment of the invention includes a tank to which a predetermined quantity of the selected solid substance, of the character above referred to, is supplied, and mechanism for supplying water under pressure into the tank, circulating the liquid and mixture from and into the tank until the substance and water are uniformly mixed or in a condition capable of being sprayed, the pressure of the water during its discharge into the tank serving to agitate the substance to insure a rapid and uniform conditioning thereof. It will be understood that where the supplied substance is insoluble in water, the mixing of the water therewith breaks up the substance into uniformly suspended particles which are held in suspension, so that the mixture may be readily sprayed; where the supplied substance is soluble in water, the mixing of the water therewith forms a solution; accordingly, in the use of the terms "material" and/or "treating material" herein I wish to be understood as comprehending both a mixture and a solution.

One object of the invention is to provide an improved apparatus of this character consisting of a mixing tank adapted to receive a quantity of solid substance or substances and a mechanism for initially supplying liquid to the tank under pressure and circulating the liquid from and to the tank for uniformly and quickly conditioning the substance or substances to provide a material capable of being sprayed on various types or kinds of plant and other organisms.

Another object of the invention is to provide an improved apparatus of this character consisting of a mixing tank adapted to receive the substance to be conditioned and a power driven mechanism adapted to initially supply liquid to the tank and then circulate the liquid from and to the tank to effect intimate contact of the substance and liquid to form a material adapted to be sprayed on plant and other organisms.

Another object of the invention is to provide an improved power driven liquid circulating mechanism adapted to be connected with a mixing tank for readily supplying liquid under pressure thereto, circulating the liquid from and into the tank to effect mixing of the liquid with the contents in the tank and discharging the conditioned material from the tank.

Another object of the invention is to provide an improved power driven liquid circulating mechanism having supply and discharge connections with a mixing tank and a pipe and valves for controlling the flow of liquid from a source of supply through said pipe and supply connection to the tank for mixing with a substance therein, circulating the liquid from the tank through the discharge connection and through the supply connection into the tank and discharge of the conditioned material from the tank.

Another object of the invention is to provide an improved power driven liquid circulating mechanism having an inlet and discharge opening, supply and discharge connections with a tank adapted to contain a substance to be conditioned, consisting of a centrifugal pump and valves controlling the initial supply of liquid through the opening and supply connection to the tank, circulation of the liquid through said discharge connection from the tank and through the supply connection into the tank and discharge of the conditioned material from the tank through the discharge connection and opening.

Figure 2:
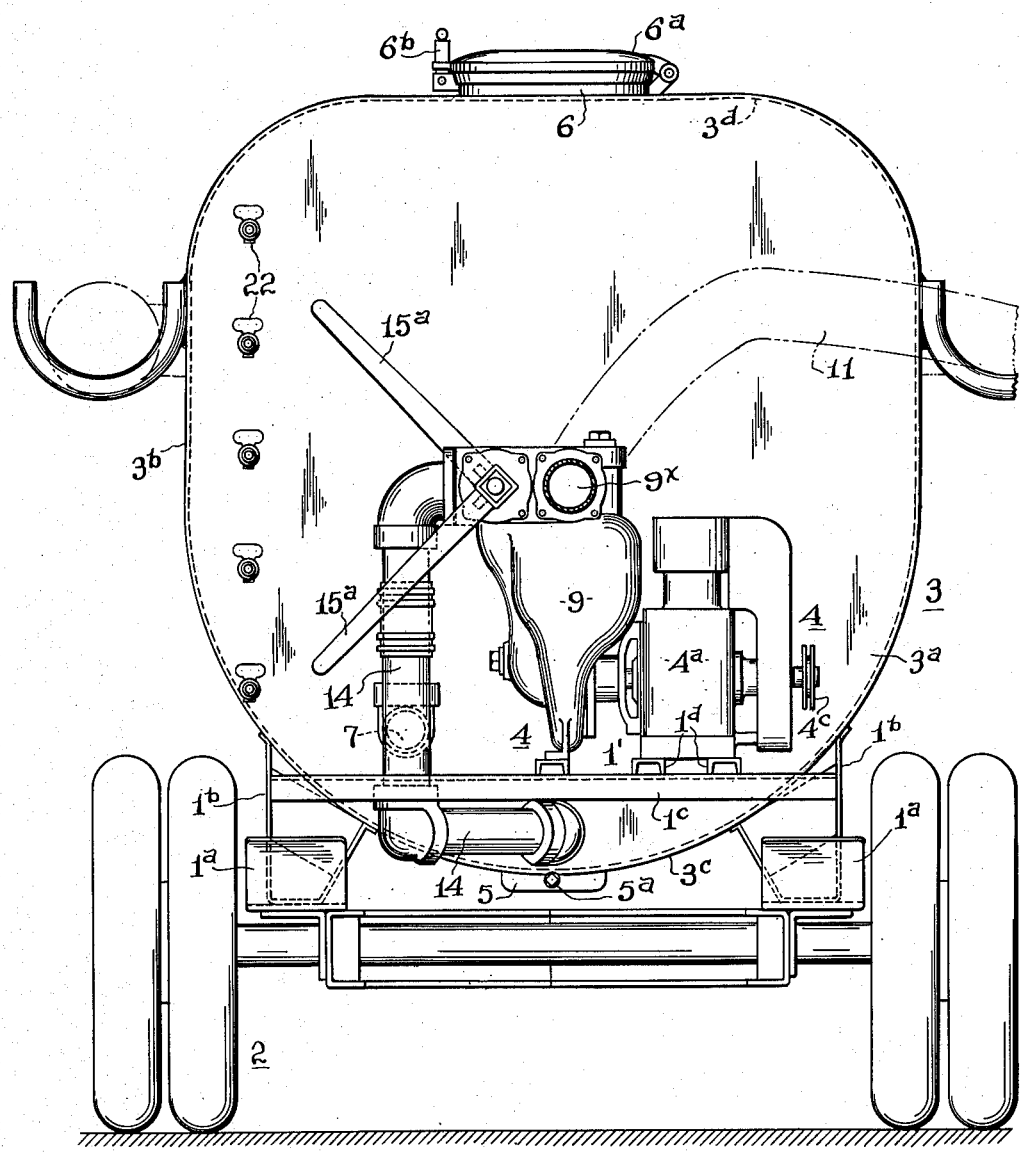
Figure 4:
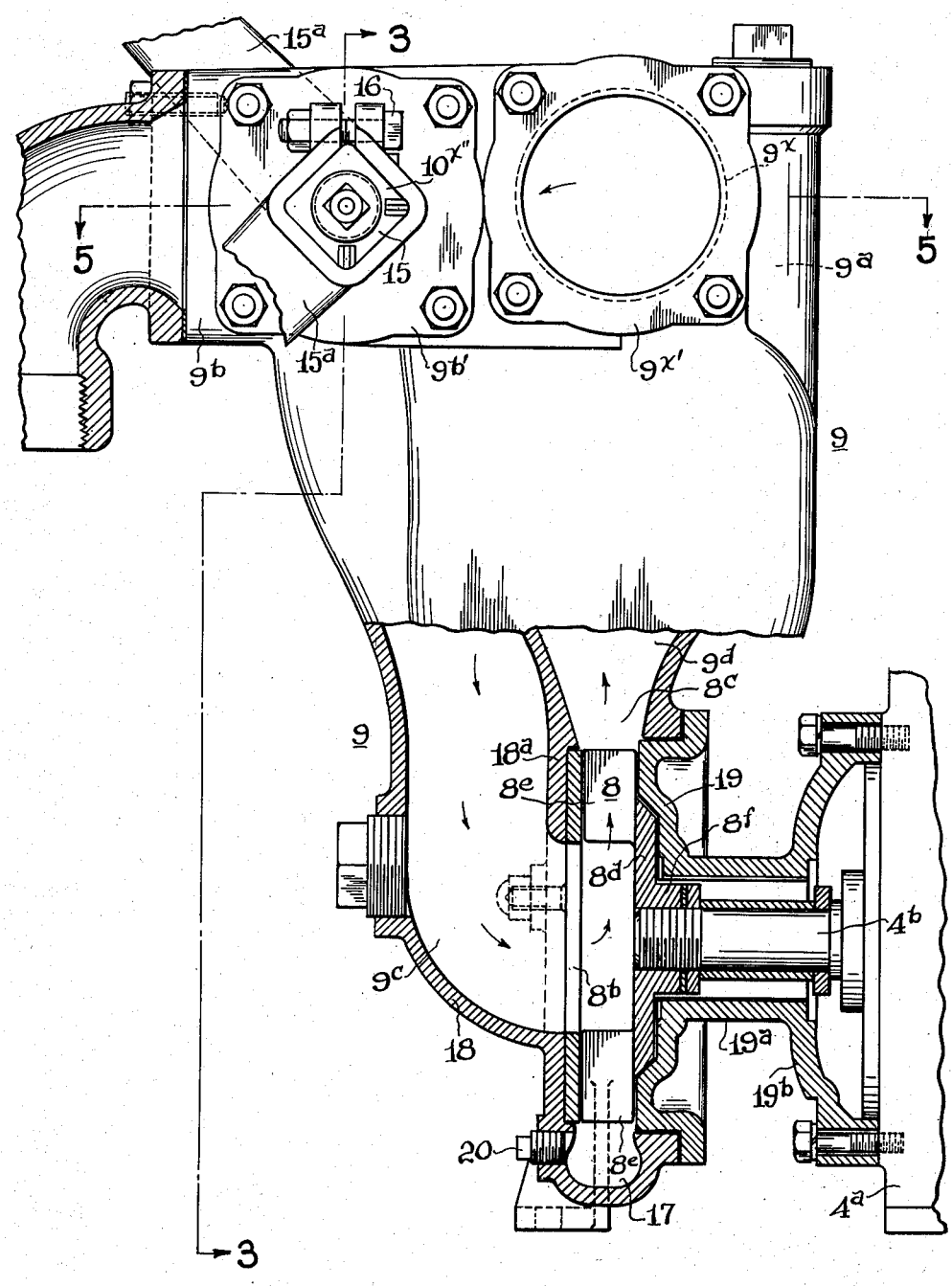
Figure 6:
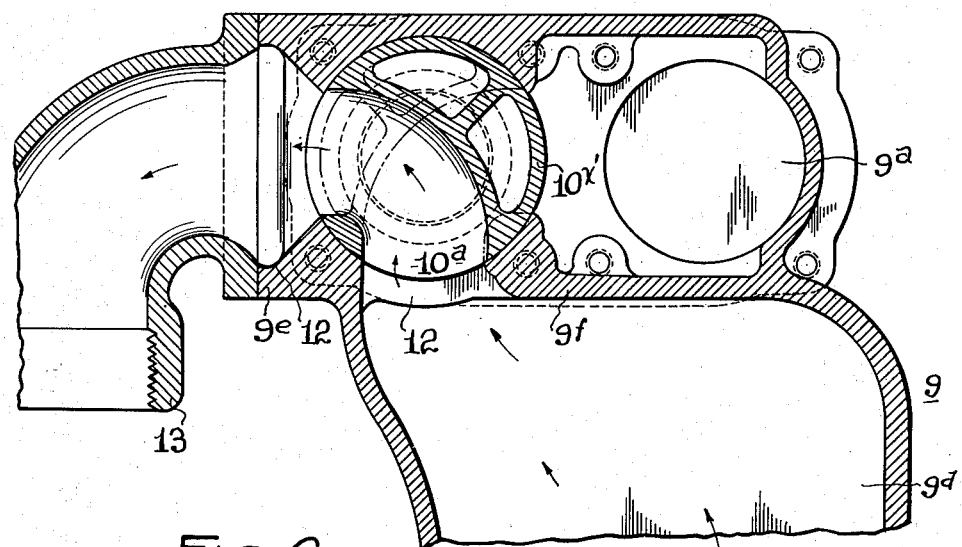
Figure 7:
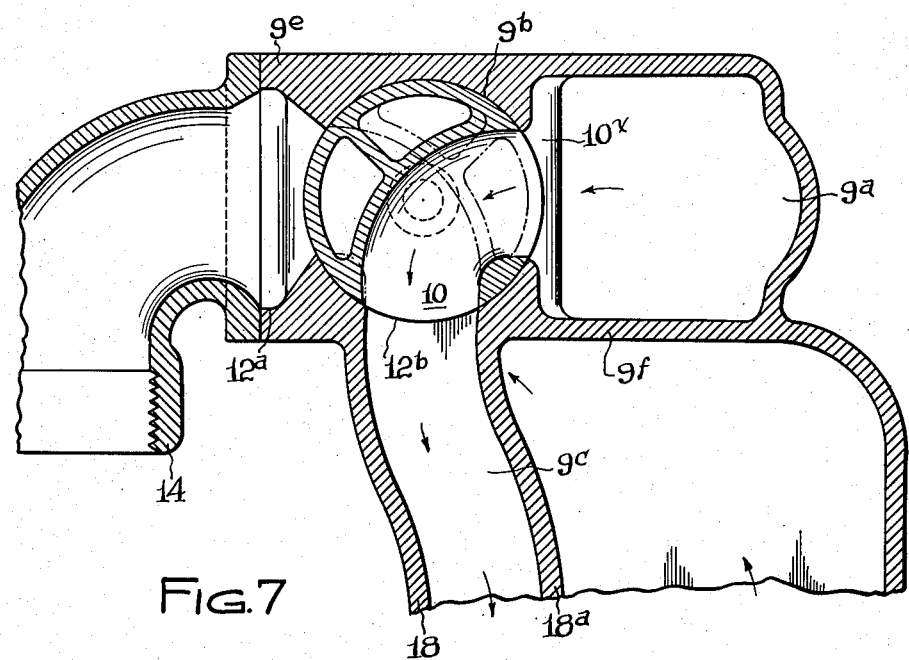
Figure 5:
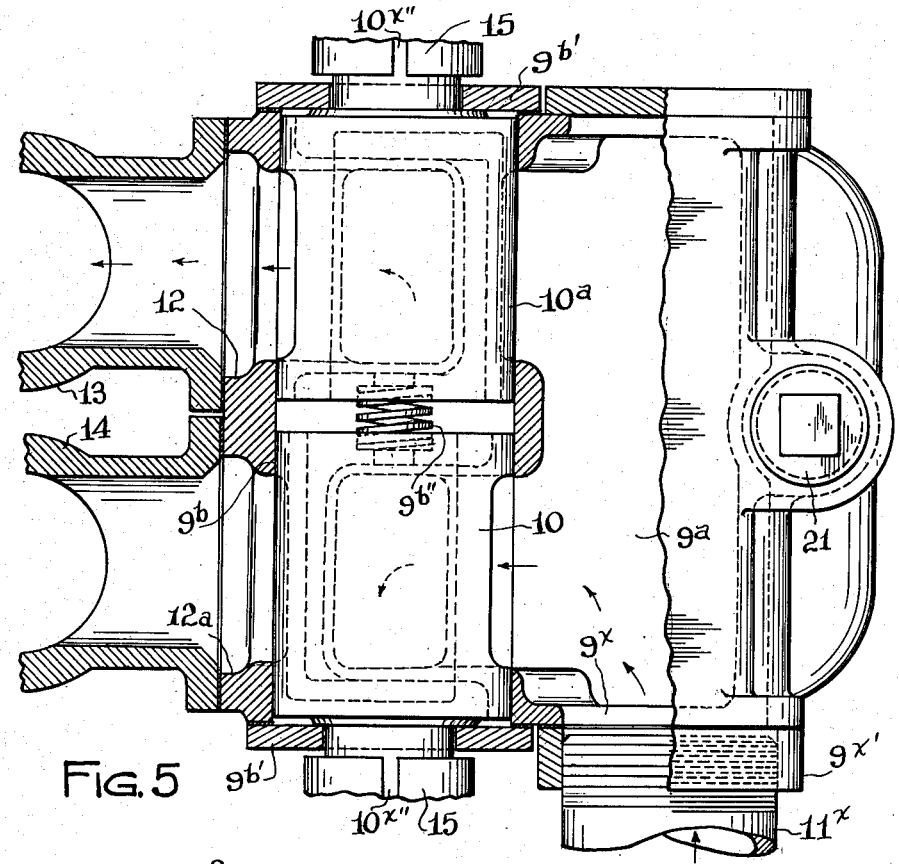
Figures 8, 9:
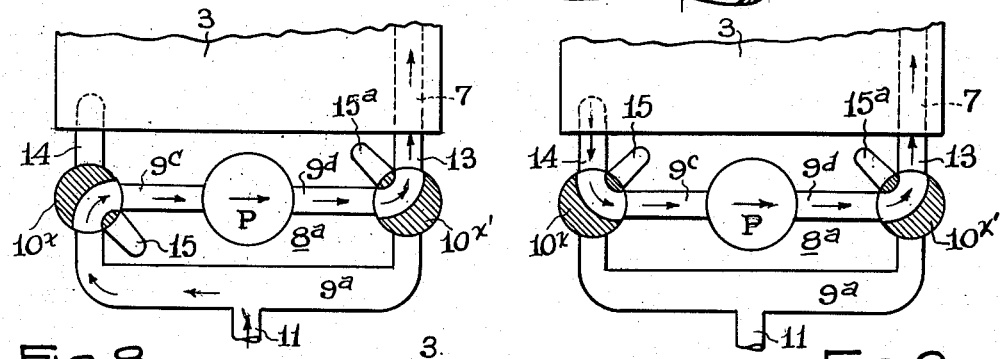

Another object of the invention is to provide an improved apparatus for conditioning a substance or substances to provide a material adapted for spraying operations, consisting of a tank and a liquid circulating mechanism of simplified compact construction having co-ordinated valves to control the supply of liquid to the tank, circulation of the liquid from and into the tank and discharge of the material therefrom.

Other objects of the invention will be apparent to those skilled in the art to which my invention relates from the following description taken in connection with the accompanying drawings, wherein:

Fig. 1 is a side elevation of an apparatus embodying my invention, parts being broken away.

Fig. 2 is an end elevation, looking toward the left of Fig. 1.

Fig. 3 is a section on the line 3—3 of Fig. 4.

Fig. 4 is a section on the line 4—4 of Fig. 3.

Fig. 5 is a view partly in section on the line line 5—5 of Fig. 4.

Figs. 6 and 7 are fragmentary sections on the lines 6—6 and 7—7 respectively, of Fig. 3.

Figs. 8, 9 and 10 are diagrammatic views.

In the drawings, 1 indicates as an entirety a base mounted on a wheel supported frame 2, which may consist of a power driven vehicle or truck or a trailer adapted to be towed by a tractor or truck, whereby the aparatus may be transported to locations where the prepared material is to be used. The base 1 may be removably mounted on the frame 2, whereby it and parts mounted thereon may be shipped or delivered as a separate unitary structure for mounting on a portable frame by a user. The base 1 consists of a pair of elongated members 1*a* each provided with a longitudinally extending U-member 1*b* on which a tank 3 is supported, the side walls of the tank being welded to the upper ends of the U-members, whereby the members 1*a* are rigidly connected in spaced parallel relation. The outer legs or sides of the U-members 1*b* support inner and outer channels 1*c*, 1*c*, on which are mounted channels 1*d* forming a sub-base 1′ for a power driven liquid pumping mechanism, indicated as an entirety at 4. The tank 3 consists of end walls 3*a*, side walls 3*b*, a bottom wall 3*c* and a top wall 3*d* forming a closed chamber. The tank 3 may be of any desired shape in cross section, but the bottom wall 3*c* is preferably of arcuate shape for a purpose later set forth, as well as to insure drainage and emptying of the tank. The bottom wall 3*c* is provided with a sump 5 for a purpose later apparent. The sump 5 is disposed adjacent that end wall 3*a*, which is adjacent the pumping mechanism 4, and provided with a drain opening closed by a plug 5*a*.

By preference, the bottom 3*c* is provided with a separate drain opening closed by a plug 3*c*′. The top wall 3*d* of the tank is formed with a filling opening having an annular seat member 6 adapted to be closed by a hinged cover 6*a* having latching devices 6*b*. 7 indicates a liquid distributing member extending into the tank 3, and forming a portion of a liquid supply conduit later referred to. The member 7 preferably consists of a pipe disposed in the lower portion and extending longitudinally of the tank 3 and within the latter the pipe is formed along its lower side with discharge openings 7*a*. As shown in Fig. 2, the distributing pipe 7 is disposed at one side of an imaginary vertical plane cutting the axis of the tank 3 and the discharge openings 7*a* are disposed on the inner side of the pipe 7, so that the streams of liquid being discharged through the openings 7*a* impinge on or strike the substance or substances in the tank at an angle and co-act with the curvature of the bottom wall to simultaneously agitate the substance and to induce flow thereof initially transversely of the tank bottom and in a general circuitous path within the tank to insure a rapid disintegration of the substance, intimate contact thereof with the water and production of a body of fluid material capable of being sprayed, the flow and circulation of the mixture within the tank being speeded up as the disintegration of the substance or substances takes place.

The liquid circulating mechanism 4 comprises a suitable power supply 4*a* mounted on the sub-base 1′ and shown as consisting of an internal combustion engine, the shaft 4*b* of which is extended and connected to the impeller 8 of a centrifugal pump 8*a* (see Fig. 4), which operates to supply liquid to the tank and to discharge the prepared or conditioned material therefrom, as later set forth. It will be apparent that the power supply 4*a* may consist of an electric motor when found desirable. The shaft 4*b* is preferably extended outwardly, as shown in Fig. 2, and provided with a pulley 4*c* for engagement by an endless belt (not shown), whereby the shaft may be driven by an auxiliary power driven device on the frame 2 or other support. The impeller 8 is mounted and rotates in a casing forming part of a sectional housing indicated as an entirety at 9. The housing 9 is shaped to form at its upper end a flow chamber 9*a* and a valve chamber 9*b* (Figs. 4, 5, and 6), the latter chamber housing two two-way rotary valves 10, 10*a*, in endwise relation. The chamber 9*b* is connected (*a*) by an intake duct 9*c* with the inlet opening 8*b* of the impeller chamber of the pump 8*a* and (*b*) by an outtake duct 9*d* leading from the discharge opening 8*c* of the pump 8*a*. The valve 10 controls the flow of liquid through the intake duct 9*c* to the pump 8*a* when the tank 3 is being filled therewith, when the liquid is being circulated from the tank and returned thereto, or when the treating material is being supplied to the flow chamber 9*a* for discharge therefrom, whereas the valve 10*a* controls the flow of the liquid from the pump 8*a* into the tank 3, when the latter is being initially filled with water and during circulation of the water or mixture from and to the tank, but when the mixing operation is completed and the treating material is to be discharged from the tank, the valve 10*a* connects the duct 9*d* with the flow chamber 9*a* for discharge therefrom. That end of the flow chamber 9*a* adjacent the valve 10 is formed with an opening 9*x*, to which is connected a flexible hose 11 terminating in a perforated member 11*a* adapted to be submerged in a container filled with water, a well or other adequate water supply, whereby, upon operation of the pump 8*a*, water may be sucked in through the hose 11 and discharged into the tank 3. When initially filling the tank 3, the opening 9*x* forms an inlet, but when the material is being discharged from the tank 3 the opening 9*x* forms an outlet and the member 11*a* then serves as a nozzle in filling the reservoir for the spraying equipment. The outer side of the side wall of the chamber 9*a* surrounding the opening 9*x* is provided with a collar 9*x*′ having an internal screw threaded wall arranged to be engaged by the threaded coupling member 11*x* on the inner end of the hose 11. The front wall 9*e* of the valve chamber 9*b* is formed with openings 12, 12*a*, whereas the bottom wall 9*f* of the chamber 9*b* is formed with openings 12b, 12c, for connection with the ducts 9c, 9d, respectively; as shown in Figs. 5, 6 and 7, the inner wall of the chamber 9b is shaped to form bearings for the valve elements 10x, 10x', so that those portions of the inner walls adjacent the openings 12, 12a, 12b, 12c, provide valve seats for the valve elements 10x, 10x', of the valves 10, 10a, respectively. As shown in Figs. 1, 2, 4, 5, 6 and 7, the opening 12 is connected to a supply pipe 13, which in turn is connected to the pipe 7 outwardly of the tank 3 (Fig. 1), whereas the opening 12a is connected to a discharge pipe 14, the inlet end of which is submerged in the liquid in the sump 5 (Fig. 1). As shown in Fig. 1, the supply pipe 13 is suitably coupled with the outer end of the distributing member 7, so that the pipe 13 and member 7 provide a continuous conduit serving to supply liquid to the tank 3, as later set forth; also, as shown in Figs. 1 and 2, the pipes 13 and 14 are respectively formed of sections suitably coupled, these coupling connections serving to facilitate assembly operations.

In the arrangement shown and above described, when the valve elements 10x, 10x', are in the position shown in full lines (Figs. 6 and 7) the valve 10 connects the chamber 9a with the duct 9c and valve 10a connects the outtake duct 9d with the pipe 13; when the valve elements are in the dotted line position valve 10 connects discharge pipe 14 with the intake duct 9c and valve 10a connects the duct 9d with the flow chamber 9a, whereby the material in the tank 3 is conveyed to the chamber 9a and discharged through hose 11.

Figure 3:
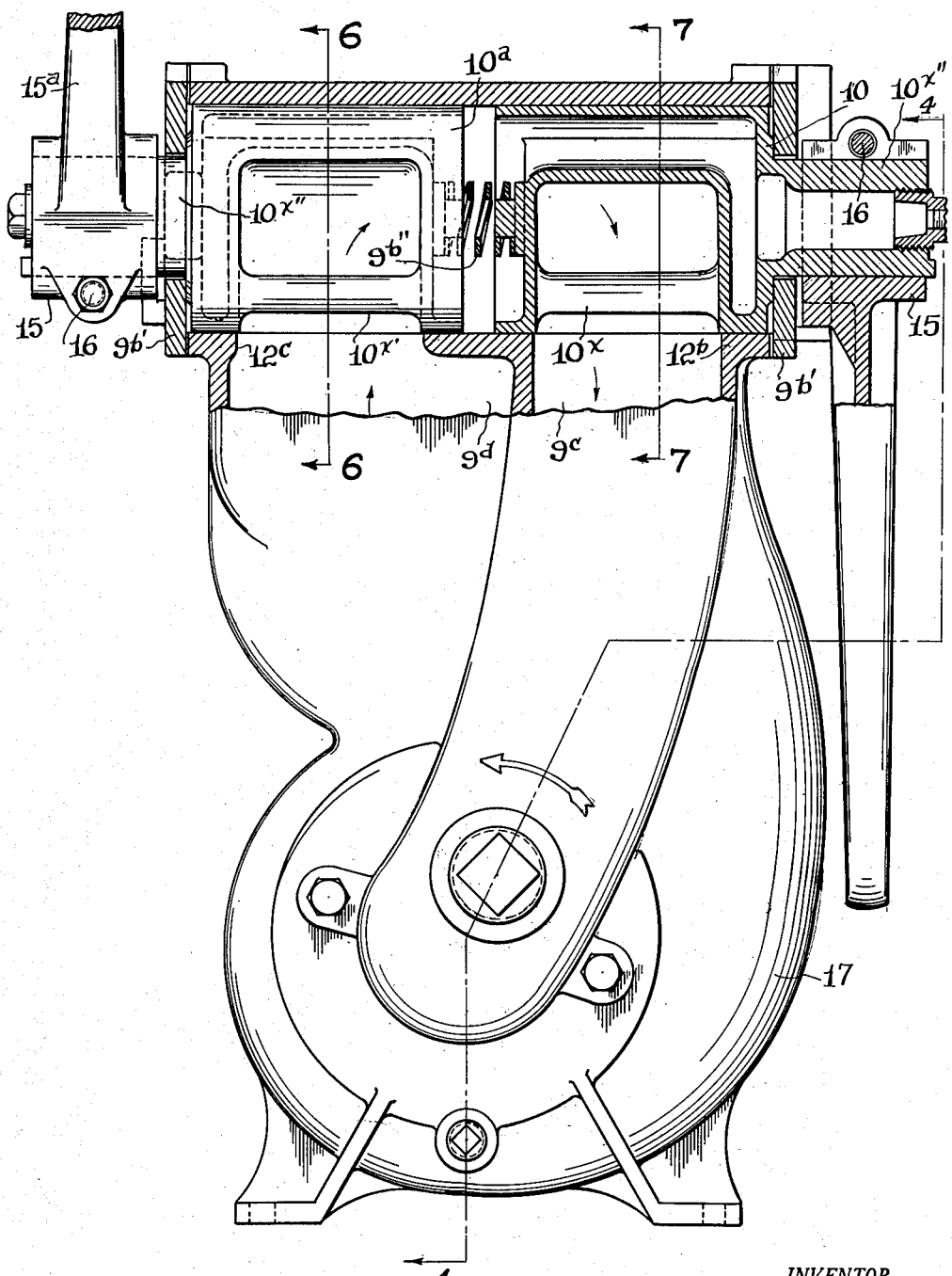

As shown in Figs. 3, 5, 6 and 7, the valve elements 10x, 10x', are exteriorly cylindrical and rotatably mounted in the walls of the chamber 9b and shaped to form flow ducts between their end walls. In this form of construction the ports of the duct in each valve and the adjacent valve seats in either position of the adjacent valve element provide a through connection for the liquid; that is, from chamber 9a to the duct 9c or from pipe 14 to duct 9c and from duct 9d to pipe 13 or from duct 9d to chamber 9a. Accordingly, the construction of the valves 10, 10a, and adjacent walls of the housing 9 are materially simplified, ready assembly of the valve elements 10x, 10x', results and provision of gaskets and glands are eliminated. As shown in Figs. 3, 5 and 6, the housing chamber 9b is open at its opposite ends to permit the bodily assembly of the valve elements and closed by removable end walls 9b' bolted in position as most clearly shown in Fig. 4. The valve elements 10x, 10x', are maintained against the end walls 9b' by a compression spring 9b'' bearing at its opposite ends against the inner end walls of the valve elements, as shown in Fig. 3. As shown in Fig. 3, the outer end wall of each valve element 10x', 10x', is provided with a hollow shank 10x'' extending outwardly and beyond the adjacent end wall of the chamber 9b and into the split hub 15 of a lever 15a. By preference, the shank 10x'' and inner wall of the hub 15 are of complementary, non-circular shape and the split portions of the hub are clamped to the shank by a bolt 16.

The impeller of the pump 8a rotates in a chamber 17 formed between the housing walls 18, 18a and 19. The wall 19 is integral with the outer end of a tube 19a through which the shaft 4b extends; the inner end of the tube 19a is integral with a bell-shaped flange 19b which is suitably bolted to the casing of the motor 4a (Fig. 4). The impeller 8 consists of a disk 8d having a plurality of radial blades 8e and a hub 8f suitably fixed to the outer end portion of the shaft 4b. The blades 8e are preferably integrally connected with the marginal portion of the disk 8d and off-set therefrom so as to revolve in a space disposed in the plane of the opening 8c. As shown in Fig. 4, the supply or inlet duct 9c leads to the impeller 8 axially thereof and inwardly of the inner ends of the blades 8e.

The impeller chamber 17 may be formed with a drain opening, closed by a suitable screw plug 20; also the top wall of the chamber 9a is formed with an opening, closed by a screw plug 21.

In addition to the wall 19, the housing 9 consists of connected together sections to form the chambers 9a, 9b, ducts 9c, 9d; the number of sections will depend on various factors, such as capacity of the mechanism, assembly operations, as well as the kind of material employed.

The inner end wall 3a of the tank is provided with a series of pet cocks 22 disposed at successive vertical levels and independently operable to serve as a gage. By opening each pet cock the approximate amount of the mixture in the tank 3 at any time can be gaged, so as to determine whether a sufficient quantity of the material is available to effect a desired spraying operation or such quantity is insufficient for the operation contemplated. By opening the pet cock 22 at the level corresponding to that attained when a predetermined quantity of water is to be supplied to the tank and then operating the mechanism to supply water to the tank, discharge of water or the mixture through the pet cock will indicate when to cut off the supply of the water.

Figure 10:
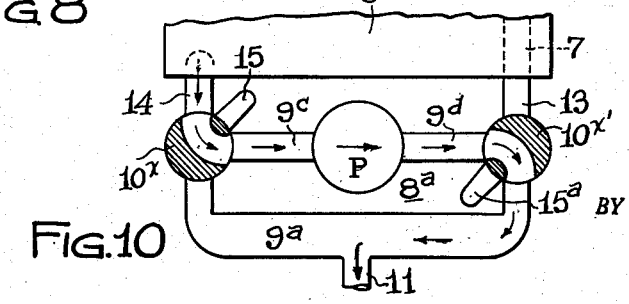

*Operation.*—First the tank 3 is filled with any desired quantity of the substance or substances to be treated. By preference such quantity in relation to 600 gallons of water will consist of 48 lbs. of lime and sulphur or 24 lbs. of copper sulphate. It will be understood that such proportions are approximate and may be varied; also, that the proportionate relationship of the substance or substances and water will depend upon the specific kind of substances and the latter will depend upon the species of the organisms to be eradicated by the sprayed material. Next, the intake member 11a is submerged in water or other liquid and the valve elements 10x, 10x', are set as shown in Figs. 1, 2, 3, 6, 7 and 8. Next, the motor 4a is started and pump 8a driven, the effect of which is to induce water flow through hose 11, flow chamber 9a, valve 10, duct 9c to pump 8a and from pump 8a through duct 9d, valve 10a and pipe 13 to distributor pipe 7. When the desired quantity of water is supplied to tank 3, as indicated by outflow through the selected pet cock 22 which was previously opened, the valve element 10x is rotated to its other position (see Fig. 9 and dotted lines in Fig. 7), the effect of which is (a) to cut off suction in the chamber 9a and hose 11 and (b) to create suction in the pipe 14; thus the liquid in the tank 3 will be drawn therefrom through pipe 14, valve 10 and duct 9c to the pump 8a which will force the liquid through duct 9d, valve 10a, and supply pipe 13 to the distributor pipe 7. The circulation of the liquid from the tank 3 and return thereinto is continued until all of the solid substance or substances have been disintegrated, mixed and/or dissolved. The pump 8a is then stopped and the apparatus transported to the area where spraying is to be carried out. The member 11a is inserted in the reservoir of the spraying equipment, the valve elements 10x, 10x', are positioned as shown in Fig. 10 (see dotted lines in Fig. 6) and pump 8a is started, the effect of which is to induce flow of the material from the tank 3, through pipe 14, valve 10, duct 9c, to pump 8a and from pump 8a through duct 9d, valve 10a, chamber 9a and hose 11 to thus fill the reservoir of the equipment with the material. It will be observed that the circulation of the materials from the tank 3 and into the tank may be carried out while the apparatus is being transported to the area to be sprayed.

From the foregoing description it will be observed that I provide a unitary simplified mechanism having flow conduits so connected with the inlet and discharge opening, impeller and tank that the respective operations of supplying the desired quantity of liquid to the tank, circulating the liquid from the bottom of the tank and into the tank for re-contact with and disintegration of the substance to be conditioned and discharge of the conditioned material from the tank may be carried out by the operation of two independently operated valves.

To those skilled in the art to which my invention relates, many changes in construction and widely differing embodiments and applications of the invention will be apparent without departing from its spirit and scope. My disclosures and the illustration herein are purely illustrative and are not intended to be in any sense limiting.

What I claim is:

1. In a mixing apparatus, the combination of a tank adapted to receive a quantity of a substance and provided therein with a hollow member for the distribution of a liquid for mixing with the substance, a supply pipe connected with said distribution member, a discharge pipe leading from the bottom of said tank, a housing providing a flow chamber formed with an opening for the intake of the liquid from a source of supply and for discharge of the mixture, a valve chamber, a power driven pump having an intake duct leading from said valve chamber to the intake thereof and a discharge duct leading from the outlet for said pump to said valve chamber, a two-way valve between the discharge end of said discharge pipe, the inlet end of said intake duct and said flow chamber to direct flow of liquid from said flow chamber to the intake duct for said pump or flow of mixture from said discharge pipe to the intake duct for said pump, and a separate two-way valve between the outlet end of said discharge duct, the inlet end of said supply pipe and said flow chamber to direct flow of mixture to said supply pipe or to said flow chamber for discharge through said opening, said valves when in one position providing for flow of liquid under influence of said pump from a source of supply through said opening to said distribution member and discharge into said tank and when said first mentioned valve is in another position providing for flow of the mixture under influence of said pump from said tank through said discharge and supply pipes to said tank and when said last mentioned valve is in another position under the influence of said pump to discharge the mixture through said discharge pipe, flow chamber and said opening.

2. An apparatus as claimed in claim 1 wherein said intake duct and said discharge duct are connected to the bottom wall of said valve chamber and the discharge and supply pipes are connected to the adjacent side wall of said valve chamber, and said two-way valves are rotatably mounted in the walls of said valve chamber one two-way valve providing a connection between said flow chamber and said intake duct or between said discharge pipe and said intake duct for said pump and the other two-way valve providing a connection between said discharge duct and said supply pipe or between said discharge duct and said flow chamber.

3. In a mixing apparatus, the combination of a tank adapted to receive a quantity of a substance to be mixed with a liquid and provided therein with a hollow member having a plurality of outlets for discharging a liquid into contact with the substance, a liquid supply pipe connected to said hollow member, a discharge pipe leading from the bottom of said tank, a power driven pump having an intake duct and a discharge duct, a housing forming a flow chamber one wall of which is formed with an opening through which liquid from a source of supply flows into said chamber and through which the mixture is discharged from said flow chamber, and separate two-way valves, when in one position, respectively connecting said discharge pipe to said intake duct and said discharge duct to said supply pipe for circulating liquid and mixture from said tank, through said pipes and into said tank, independently of said flow chamber, the valve between said intake duct and discharge pipe, when in its other position, being arranged to cut off said discharge pipe and connect said flow chamber to said intake duct, whereby the operation of said pump will induce a flow of material from the source of supply through said opening, flow chamber and intake duct and discharge it through said discharge duct and supply pipe to said hollow member and said valve between said discharge duct and said supply pipe, when in its other position, being arranged to cut off said supply pipe and connect said discharge duct to said flow chamber, whereby, with said first valve in its first mentioned position, operation of said pump will induce a flow of the mixture from said tank through said discharge pipe, intake duct, discharge duct to said flow chamber for discharge through said opening.

4. In mixing apparatus, the combination of a tank adapted to receive a quantity of a substance or substances and provided therein with a liquid distributor member formed with discharge outlets, a supply pipe connected at its outer end to said distributor member, a discharge pipe leading from the lower portion of said tank, a mechanism including a housing shaped to form a flow chamber and a valve chamber the end walls of which latter chamber are formed with alined openings, an intermediate wall in said valve chamber and formed with an opening axially related to said alined openings, a power driven pump mounted in said housing, an intake duct connected to the intake of said pump, an outtake duct leading from said pump, said flow chamber being formed with an opening through which liquid from a source of supply flows to said chamber and through which the mixture is discharged from said chamber, one side wall of said valve chamber being formed with openings connected to the inlet end of said supply pipe and outlet end of said discharge pipe, respectively, another side wall of said valve chamber being formed with openings connected to said intake and outtake ducts, respectively, a two-way valve rotatably mounted at its opposite ends in the opening in the adjacent end wall of said valve chamber and the opening in said intermediate wall and between said outtake duct and said supply pipe and a separate two-way valve rotatably mounted at its opposite ends in the opening in the adjacent end wall of said valve chamber and the opening in said intermediate wall and between said discharge pipe and said intake duct, said valves being arranged when in one position to provide for flow of liquid under the influence of said pump through said supply and discharge opening to said distributor member and discharge it into said tank, and when in another position to provide for flow of the material under influence of said pump from said tank through said discharge pipe for discharge through said supply and discharge opening, and when said first mentioned valve is in its first mentioned position and said separate valve is in its second mentioned position to connect said outtake duct with said supply pipe, whereby the material in said tank is circulated through said discharge pipe and said supply pipe to said distributor member.

WARREN E. RUPP.

REFERENCES CITED

The following references are of record in the file of this patent:

UNITED STATES PATENTS

| Number | Name | Date |
|---|---|---|
| 659,278 | Argerbright | Oct. 9, 1900 |
| 1,227,369 | Bell | May 22, 1917 |
| 2,123,156 | Jagoe | July 5, 1938 |
| 2,246,866 | Stribling et al. | June 24, 1941 |